Aug. 20, 1968     M. A. D'AMBROSIO     3,397,580
PRESSURE RATIO TRANSDUCER
Filed Sept. 9, 1965                                            4 Sheets-Sheet 1

INVENTOR.
MICHAEL A. D'AMBROSIO
BY
*Shenier & O'Connor*
ATTORNEYS

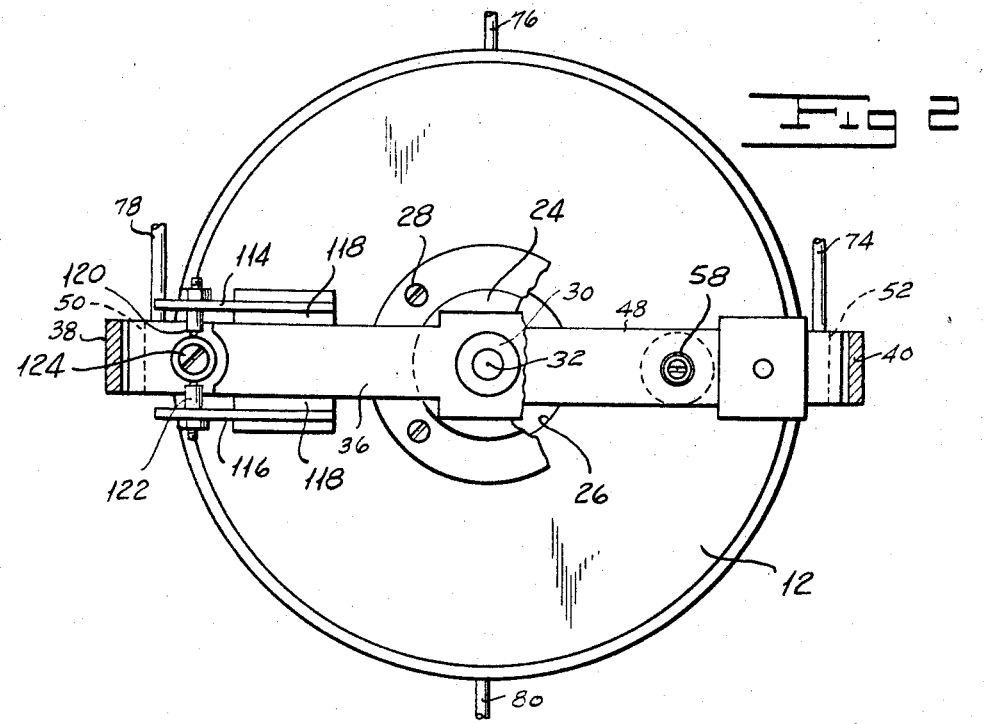
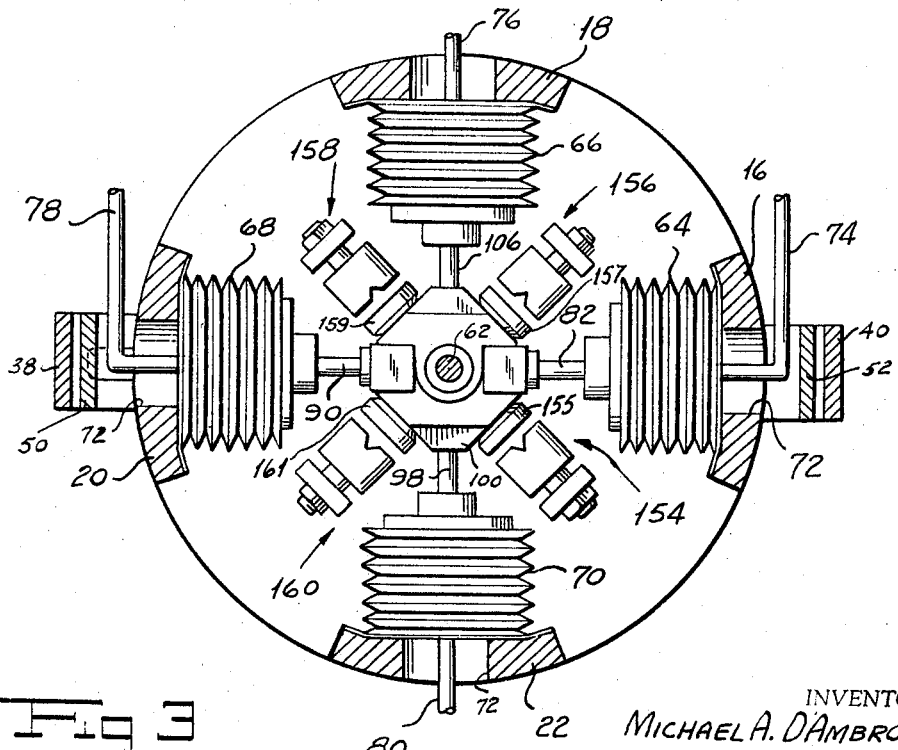

Aug. 20, 1968   M. A. D'AMBROSIO   3,397,580
PRESSURE RATIO TRANSDUCER
Filed Sept. 9, 1965   4 Sheets-Sheet 3
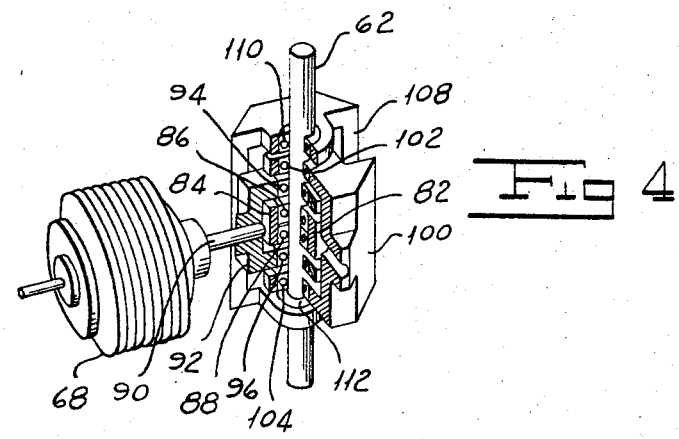
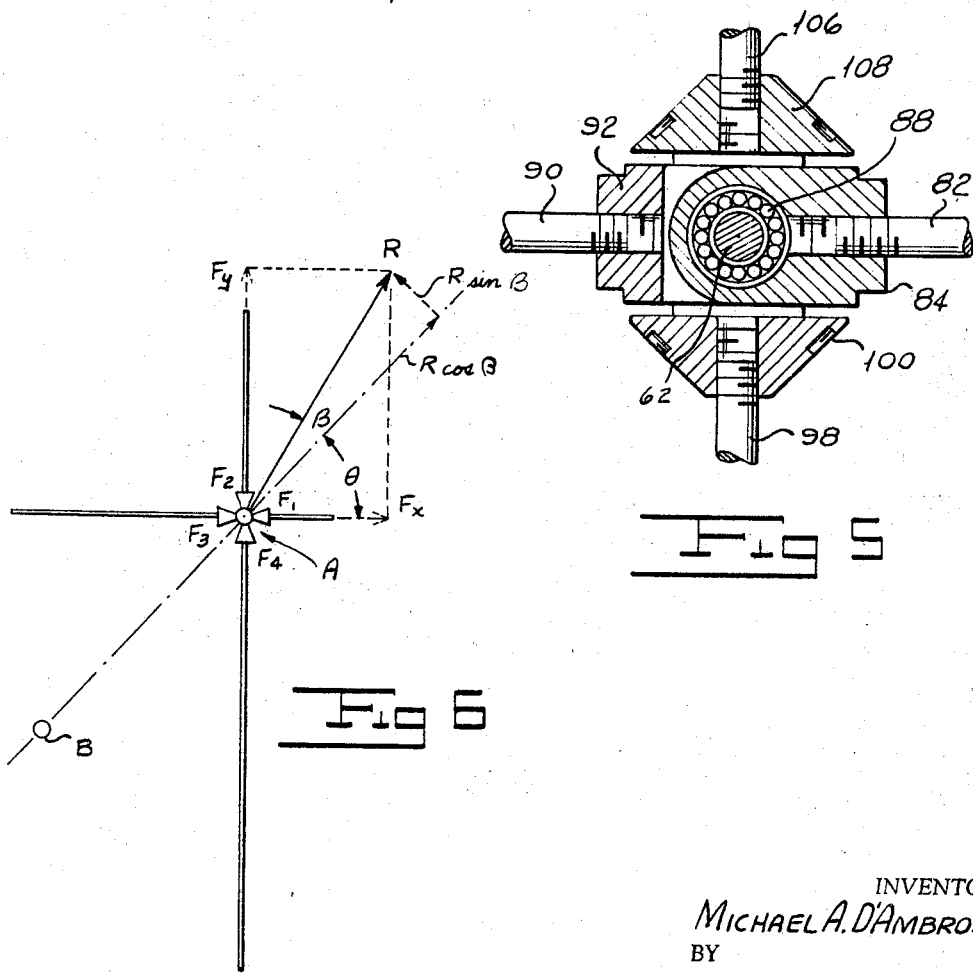
INVENTOR.
MICHAEL A. D'AMBROSIO
BY
Shenier & O'Connor
ATTORNEYS

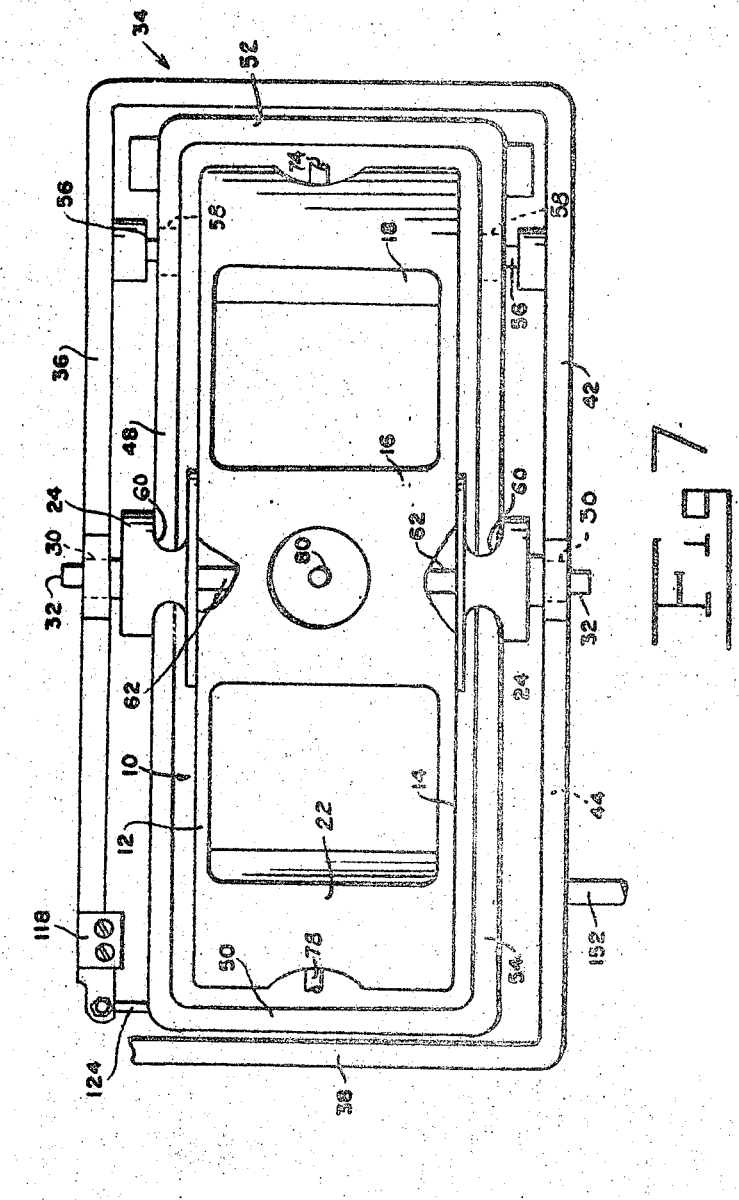

United States Patent Office 3,397,580
Patented Aug. 20, 1968

3,397,580
PRESSURE RATIO TRANSDUCER
Michael A. D'Ambrosio, Port Chester, N.Y., assignor to United Aircraft Corporation, East Hartford, Conn., a corporation of Delaware
Filed Sept. 9, 1965, Ser. No. 486,114
5 Claims. (Cl. 73—407)

ABSTRACT OF THE DISCLOSURE

A pressure ratio transducer in which forces are applied to a lever along orthogonal axes at a point spaced from a lever pivot carried by an arm rotatably mounted on a support by a pivot spaced from the first pivot. In response to a displacement of the lever from a position at which it is aligned with the arm, drive means comprising a member moving linearly along a straight line located at a constant distance from the arm axis moves the arm to a position at which the lever and the arm are aligned.

---

My invention relates to a pressure ratio transducer and more particularly to an improved pressure ratio transducer which is simple, inexpensive, reliable and which has increased sensitivity and accuracy.

There are many circumstances in which it is necessary to measure pressure ratios. One of the most important applications of pressure ratio transducers is the measurement of EPR or engine pressure ratio to afford a measure of thrust. In applications of this type the instrument employed must be rugged and reliable and should be simple and as inexpensive as is consistent with the reliability requirement. It is desirable further that the instrument be unaffected or at least not affected to an appreciable degree by changes in temperature. Further, owing to the fact that the instrument is required to operate over a relatively wide range of pressure, its sensitivity should be as independent of pressure level as possible.

I have invented a pressure ratio transducer which is reliable and yet which is simple and inexpensive. My transducer is not appreciably affected by changes in temperature. All parts of the transducer have a relatively long life. My device has a sensitivity which is substantially independent of pressure level.

One object of my invention is to provide a pressure ratio transducer which is reliable, simple and inexpensive for the result achieved thereby.

Another object of my invention is to provide a pressure ratio transducer, the sensitivity of which is independent of pressure level.

A further object of my invention is to provide a pressure ratio transducer, the output of which is not appreciably affected by changes in temperature.

Still another object of my invention is to provide a pressure ratio transducer, the parts of which have a relatively long life.

Other and further objects of my invention will appear from the following description.

In general my invention contemplates the provision of a pressure ratio transducer in which I apply input pressures along orthogonal axes to a lever pivotally supported on a yoke at a point remote from the yoke axis of rotation. A sensor responsive to angular movement of the lever in response to a difference in the resultant pressures along the orthogonal axes drives the yoke to a null position at which the lever and yoke are aligned, thus to provide a measure of the pressure ratio.

In the accompanying drawings which form part of the instant specification and which are to be read in conjunction therewith and in which like reference numerals are used to indicate like parts in the various views:

FIGURE 2 is a top plan view of my pressure ratio transducer with parts broken away.

FIGURE 3 is a sectional view of my pressure ratio transducer immediately below the top thereof.

FIGURE 4 is a fragmentary view of my pressure ratio transducer with parts broken away and with other parts shown in section.

FIGURE 5 is a fragmentary sectional view of a portion of my pressure ratio transducer drawn on an enlarged scale.

FIGURE 6 is a diagrammatic view illustrating the operation of my pressure ratio transducer.

FIGURE 7 is a side elevation of my pressure ratio transducer.

Figure 1:
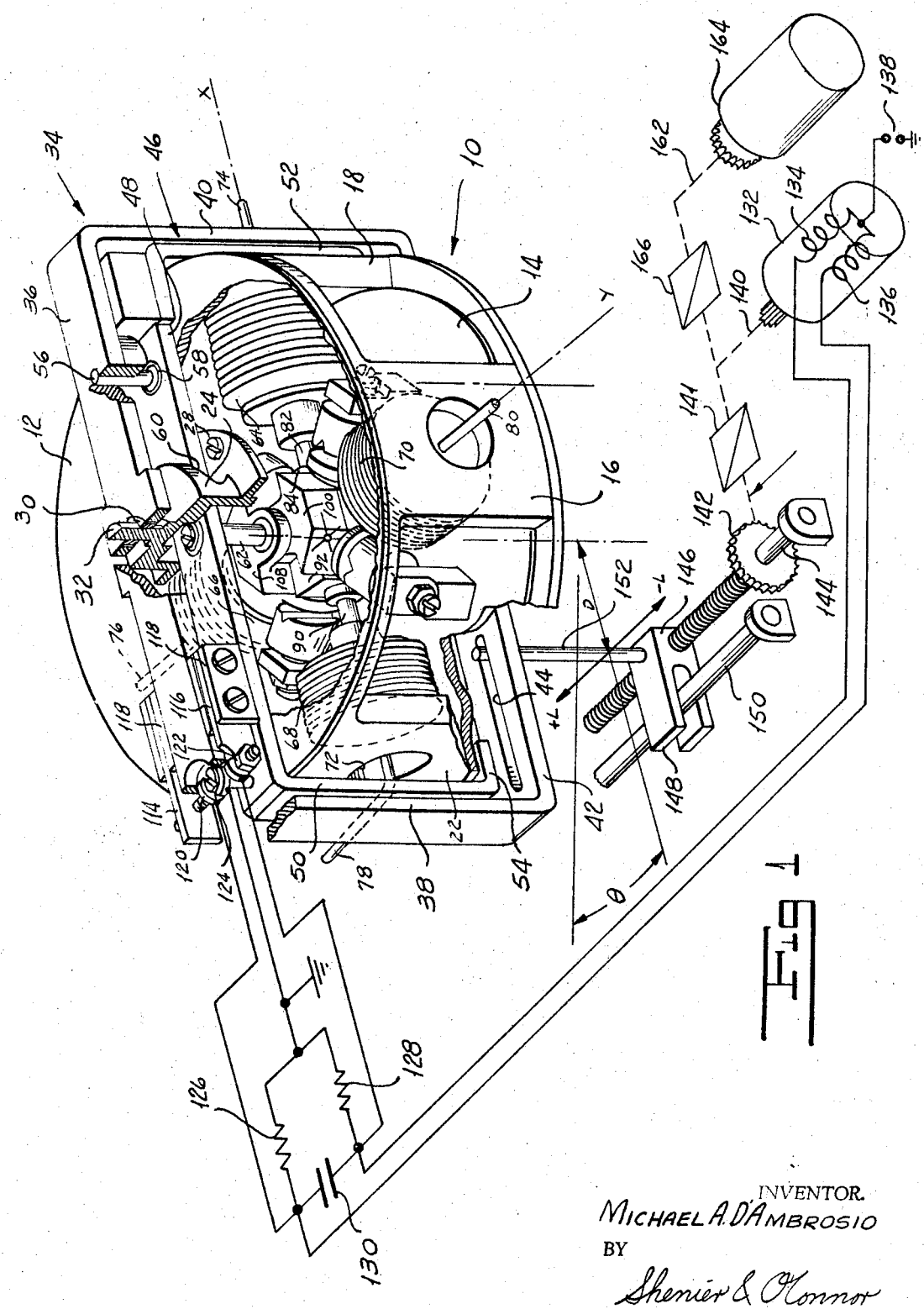
FIGURE 1 is a perspective view illustrating my pressure ratio transducer with parts broken away and with other parts shown in section.

Referring now to the drawings, my transducer includes a cylindrical housing indicated generally by the reference character 10 having a top 12, a base 14 and spaced side wall portions 16, 18, 20 and 22. I mount caps or bearing supports 24 over central openings 26 in the top 12 and base 14 by any suitable means such, for example, as by screws 28. Supports 24 carry respective bearings 30 on stub shafts 32 pivotally to support a generally rectangular yoke indicated generally by the reference character 34 for movement around a vertical axis. Yoke 34 may have a top carried by one of the bearings 30, sides 38 and 40 and a bottom 42 supported on the other bearing 30. Bottom 42 has a slot 44 permitting the yoke to be driven in a manner to be described hereinafter.

My transducer also includes a generally rectangular lever indicated generally by the reference character 46 having a top 48, sides 50 and 52 and a bottom 54. The top 36 and the bottom 34 carry respective pivot pins 56 at a location spaced from the axes of shaft 32. Pins 56 are received in bearings 58 carried respectively by the top 48 and by the bottom 54 of the lever 46 to permit the lever to pivot around the axis of pins 56. The top 48 and the bottom 54 of the lever extend through openings 60 in the caps 24 and over the central openings in the top 12 and the base 14 of the housing.

I secure a rod 62 to the top 48 and to the bottom 54 of the lever 46 at the center thereof. I mount respective bellows 64, 66, 68 and 70 on the walls 16, 18, 20 and 22 by any suitable means. Walls 16, 18, 20 and 22 have openings 72 through which respective tubes 74, 76, 78 and 80 extend to permit the introduction of fluid to the interior of the associated bellows.

I provide my device with means for applying the forces resulting from the application of pressures to the bellows to the rod 62. For example, I thread or otherwise attach a rod 82 carried by the end of bellows 64 remote from wall 16 to a collar 84 carrying a pair of bearings 86 and 88 surrounding the rod 62. In response to pressure admitted to the interior of the bellows 64 which is, for example, greater than ambient pressure, rod 82 tends to move to the left as viewed in FIGURE 3, as the bellows expands to apply a force to the rod 62. I connect a rod 90 to a force transmitting member 92 carrying spaced bearings 94 and 96 surrounding rod 62 immediately above and below bearings 86 and 88 respectively.

In a similar manner I attach a rod 98 carried by the end of bellows 70 remote from wall 22 to a support 100 carrying spaced bearings 102 and 104 surrounding rod 62, respectively, above and below bearings 94 and 96 as viewed in FIGURE 4. A fourth rod 106 secures the end of bellows 66 remote from wall 18 to a support 108 carrying spaced bearings 110 and 112 surrounding rod 62, respectively, above and below the bearings 102 and 104 as viewed in FIGURE 4.

From the structure just described, it will be seen that in response to the admission of fluid under pressure to the interior of bellows 64 and 68, a force is applied to rod 62 along the common axis of rods 82 and 90 and that force is proportional to the difference in the pressures supplied to the respective bellows. Similarly, in response to the admission of fluid under pressure to bellows 66 and 70, a force is applied to rod 62 in the direction of the common axis of rods 98 and 106, which force is proportional to the difference between the pressures of the fluids admitted to bellows 64 and 68. Moreover, the common axis of rods 82 and 90 is perpendicular to the common axis of rods 98 and 106.

By way of illustration, let us assume that respective pressures $P_1$, $P_2$, $P_3$ and $P_4$ are supplied to the inlet pipes 74, 76, 78 and 80. Referring to FIGURE 6, as a result of the application of these pressures, there will be applied at a point along the length of rod 62 four forces $F_1$, $F_2$, $F_3$ and $F_4$ with the forces effectively in the same plane and with $F_1$ opposed to $F_3$ and with $F_4$ and $F_2$ opposed. For purposes of illustration in FIGURE 6 I have illustrated the forces by solid lines acting at a point indicated generally by the reference character A and I have indicated the pivot point of the lever top 48 as B so that the effective length of the lever from its pivot to the point at which the forces are applied is AB. I have further indicated the resultant force in the direction of the $x$ axis as $F_x$ and the resultant force in the direction of the $y$ axis as $F_y$. Under the action of these forces there is a resultant force R making an angle $\beta$ with the axis of the lever so that it has a component $R \cos \beta$ in the direction of the rod length and a component $R \sin \beta$ in a direction perpendicular to the axis of the rod. From that position, as I explained more fully hereinafter, I drive the yoke to a position at which the yoke and lever are aligned and the resultant force acts along a line passing through the axis of rod 62, the axis of shaft 32 and the axis of pivot 56. In other words, by aligning the yoke and the lever, the component $R \sin \beta$ has effectively been reduced to zero and $R = R \cos \beta$. As can be seen from the diagram in this neutral or null position the yoke makes an angle with the $x$ axis, along which the axes of rods 82 and 90 lie. This angle affords a measure of the pressure ratio.

If $P_a$ is the ambient pressure and all of the bellows are the same so that they have the same spring rate K, preload X and the same effective area A, for the force $F_x$ in the direction of the $x$ axis I can write:

(1) $F_x = F_3 - F_1 = [(P_3 - P_a)A + KX] - [(P_1 - P_a)A + KX]$
$= (P_3 - P_1)A$

By the same token (2) $F_y = (P_4 - P_2)A$

Taking the ratio of the two forces $F_x$ and $F_y$ (3) $\dfrac{F_y}{F_x} = \dfrac{(P_4 - P_2)A}{(P_3 - P_1)A} = \dfrac{P_4 - P_2}{P_3 - P_1} = \dfrac{P_{yy}}{P_{xx}}$ If the $xx$—$yy$ axes are mutually perpendicular, then (4) $\dfrac{P_4 - P_2}{P_3 - P_1} = \tan \theta$ Further, if $P_2 = P_3$ and $P_1 = 0$ (that is, $P_1$ is evacuated)

(5) $\dfrac{P_4 - P_2}{P_2} = \tan \theta$ or (6) $\dfrac{P_4}{P_2} = \tan \theta + 1$ Thus is can be seen that the yoke angle $\theta$ between AB and the $x$ axis, for example, is a measure of the ratio of the two pressures $P_4 - P_2$. It will be apparent that the resultant component force $R \cos \beta$ which acts in the direction of the axis of AB will not tend to produce any movement of the lever 46. However, if the resultant force has a component $R \sin \beta$ this component tends to rotate the lever 46 around its pivot 56 in one direction or the other depending on the direction of this component.

I provide my pressure ratio transducer with means for sensing displacement of the lever 46 from a null position at which it is aligned with the yoke 34. The top 36 of the yoke 34 carries a pair of spaced electrical contact arms 114 and 116 mounted on the top 36 by insulating blocks 118 or the like. Arms 114 and 116 carry respective contacts 120 and 122 which are out of engagement with a contact 124 on the top 48 of the lever 46 when the lever top 48 is aligned with the top 36 of the yoke. When, however, the lever moves out of alignment with the yoke, one or the other of the contacts 120 and 122 engages contact 124. I connect respective resistors 126 and 128 in parallel between the respective contacts 120 and 122 and ground. I connect a capacitor 130 across the terminals of resistors 126 and 128 connected to the contacts. It will readily be appreciated that when one or the other of the contacts 120 and 122 engages contact 124 the corresponding resistor 126 or 128 is shunted. My system includes a servo motor 132 having windings 134 and 136 connected, respectively, between resistors 126 and 128 and a suitable source of voltage 138. When the system is in balance with the yoke and the lever aligned, the motor 132 will not be driven. If, however, one of the resistors 126 or 128 is shunted, motor 132 will be driven in one direction or the other.

Gearing 141 connects the output shaft of motor 132 to a pinion 142 carried by a worm shaft 144. Worm 144 threadably engages a nut or follower element 146 having a bifurcated end 148 which slides on a guide rod 150. I so arrange the worm 144 and its nut 146 that the nut is driven in a direction parallel to the $y$ axis, which is the common axis of rods 98 and 106, in response to rotation of the worm. In this manner, as is explained hereinafter, rotation of the worm may be correlated with the yoke angle $\theta$. I provide the follower 146 with a drive rod 152 which rides in the slot 44 in the bottom 42 of the yoke. I so arrange the parts of my transducer that when lever 46 rotates in a clockwise direction with respect to the yoke as viewed in FIGURE 2 to engage contact 124 with contact 120, motor 132, acting through gearing 140 drives worm 144 in a direction to move the yoke in a clockwise direction. In other words, in response to a displacement in one direction of the lever with respect to the yoke, the yoke will be driven by the motor in the same direction to align the yoke and the lever. When the yoke and lever are aligned, contact 124 is out of engagement with contacts 120 and 122 and the parts 36 and 48 have been driven to an aligned relative position such that the yoke makes an angle $\theta$ with the $x$ axis and the component $R \sin \beta$ disappears.

I provide my system with four identical magnets indicated generally by the reference characters 154, 156, 158 and 160 for cooperation with respective buttons 155, 157, 159 and 160 of paramagnetic material. I mount the buttons 155 and 161 on the support 100 for movement therewith. Buttons 157 and 159 are secured to the support 108 for movement therewith. It will readily be appreciated that when rod 62 moves the buttons likewise move. These magnets and buttons interact to provide a negative spring rate to compensate for the positive spring rate of the bellows, thus increasing the sensitivity of the system.

In order to provide an electrical signal which is an indication or measure of the force ratio I connect the input shaft 162 of an output transducer 164 to the shaft 140 of motor 132 by gearing 166.

From the arrangement thus far described, it will be seen that with the yoke 34 aligned with the $x$ axis, the angle $\theta$ is zero. Under these conditions the nut 146 or the point at which the nut is connected to drive rod 152 is a distance D along the $x$ axis from the axis of the yoke and nut 148 is considered to be in a zero position with reference to its direction or movement perpendicular to the $x$ axis. In order to position the yoke at an angle $\theta$, nut 146 is driven a distance L in a direction parallel to the y axis.

In the particular form of the apparatus I have illustrated, I cause the nonlinear relationship defined by Equation 6 above to produce an output angle $\alpha$ which is proportional to the ratio $P_4/P_2$. With this arrangement tan $\theta = L/D$ and L is proportional to screw rotation $\alpha$ so that (7)
$$\frac{P_4}{P_2} = C(\alpha) + 1$$

where C is selected to accommodate the scaling for the particular application. When $\theta$=zero degree, $\alpha$=zero degree and the ratio $$\frac{P_4}{P_2} = 1$$

When $\theta$ is positive, $\alpha$ is positive, and the ratio $$\frac{P_4}{P_2} > 1$$

When $\theta$ is negative, $\alpha$ is negative and the ratio $$\frac{P_4}{P_2} < 1$$

Since the angle $\alpha$ is a measure of the pressure ratio, the output of gearing 141 and the input to transducer 164 are likewise measures of the pressure ratio.

In operation of my pressure ratio transducer, I apply the four pressures $P_1$, $P_2$, $P_3$ and $P_4$ to the inlet pipes 74, 76, 78 and 80 to cause the corresponding bellows 64, 66, 68 and 70 to apply forces to the lever 48 through the medium of the rod 62. All of the forces effectively act along lines passing through the point A. If I represent the forces produced by the bellows, respectively, as $F_1$ to $F_4$ then, as is pointed out hereinabove, a resultant force along the x axis of $F_3 - F_1$ which corresponds to $(P_3 - P_1)A$ is applied along the x axis and a force $F_y = F_4 - F_2$ which is $(P_4 - P_2)A$ acts along the y axis. These forces produce a resultant force R. If this resultant force makes an angle with the longitudinal axis of lever 48 of $\beta$ then the component forces will be $R \sin \beta$ tending to rotate lever 48 around its pivot 56 and a component $R \cos \beta$ acting in the direction of the axis of the lever.

In response to the force component tending to rotate lever 48, the end of the lever carrying the contact 124 is displaced to engage that contact with either contact 120 or contact 122 to energize motor 132 to drive worm 144 in such a direction as will actuate the yoke 36 to move in a direction to move the contact out of engagement. This operation may be stated in a number of ways. First, it causes the yoke top 36 and the lever top 48 to return to aligned positions. In doing this, it reduces the force component $R \sin \beta$ to zero. In other words, it causes the longitudinal axis of the top 48 to be colinear with the resultant force R. That is, it so orients pivot 56 and the point at which the rod 62 is secured to the lever top 48 that the resultant force acts along the line passing through both these points. Further, as is pointed out hereinabove, the rotational angle $\alpha$ of the lead screw is a measure of pressure ratio and of the angle $\theta$ so that the rotation of the input shaft 162 of the transducer is proportional to tan $\theta$.

While I have illustrated my invention in connection with a force produced by pressure, it will readily be appreciated that the force may be magnetic or hydraulic, a spring force or the force of gravity, instead of being pneumatic.

It will be seen that I have accomplished the objects of my invention. I have provided a pressure ratio transducer which is simple, reliable and inexpensive. The sensitivity of my transducer is independent of pressure level. The output of my device is not appreciably affected by changes in temperature. The parts of my device have a relatively long life.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A force ratio transducer for producing a signal indicating the ratio of two forces including in combination, a lever having a longitudinal axis, means providing a movable pivot for said lever at a first point along said axis, means for applying a first force to said lever along a first line passing through a second point spaced along said axis from said first point, means for applying a second force to said lever along a second line passing through said second point and forming an angle less than 180° with said first line, said forces producing a resultant force acting on said lever, means for orienting said pivot to a position at which said lever axis and said resultant force are colinear, said orienting means comprising a second lever carrying said pivot, a support mounting said second lever for pivotal movement at a point thereon spaced from said pivot, drive means comprising a drive member constrained to move linearly along a straight line located at a fixed distance from said second lever pivot, means operatively connecting said drive means to said second lever, means for producing a signal which is proportional to the ratio of said forces and means responsive to deviation of said pivot from said position for actuating said orienting means.

2. A transducer as in claim 1 in which said drive member comprises a lead screw, said operatively connecting means comprising a pin and slot connection between said lead screw and said second lever.

3. A transducer as in claim 1 in which said force applying means are pairs of opposed bellows and in which said lines are orthogonal axes.

4. A transducer as in claim 1 in which said deviation responsive means comprises electrical contacts carried respectively by said first and second levers.

5. A transducer as in claim 1 in which said orienting means comprises a motor having a shaft for driving said drive member, the rotation of said shaft being proportional to the ratio of said forces.

References Cited

UNITED STATES PATENTS

| | | | |
|---|---|---|---|
| 3,038,339 | 6/1962 | Colvin | 73—407 |
| 3,162,047 | 12/1964 | Rosenberger | 73—407 |
| 3,218,864 | 11/1965 | Schugt | 73—407 |
| 3,266,320 | 8/1966 | Abrams et al. | 73—407 |
| 3,299,701 | 1/1967 | Scarlett | 73—407 |
| 3,312,109 | 4/1967 | Kutzler | 73—182 X |

FOREIGN PATENTS

| | | |
|---|---|---|
| 636,236 | 2/1962 | Canada. |
| 976,293 | 11/1964 | Great Britain. |

DAVID SCHONBERG, *Primary Examiner.*

D. O. WOODIEL, *Assistant Examiner.*